(Model.)
W. B. CULLUM.
CULTIVATOR.
No. 255,256. Patented Mar. 21, 1882.
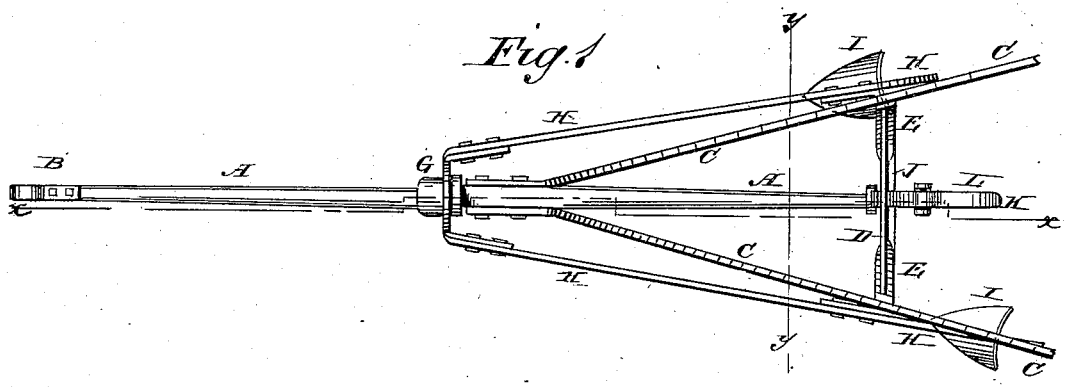
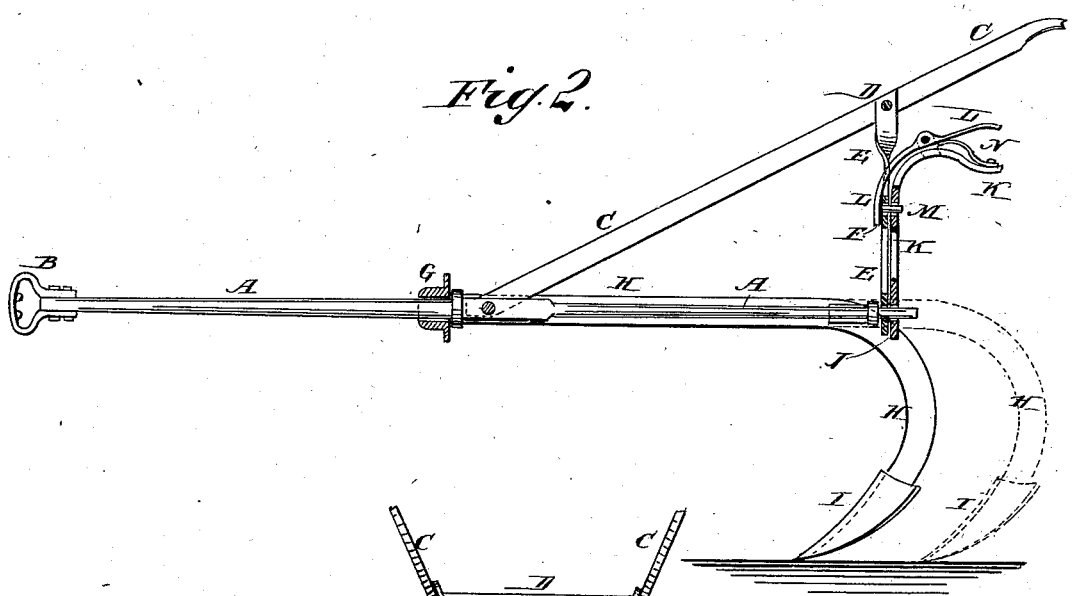
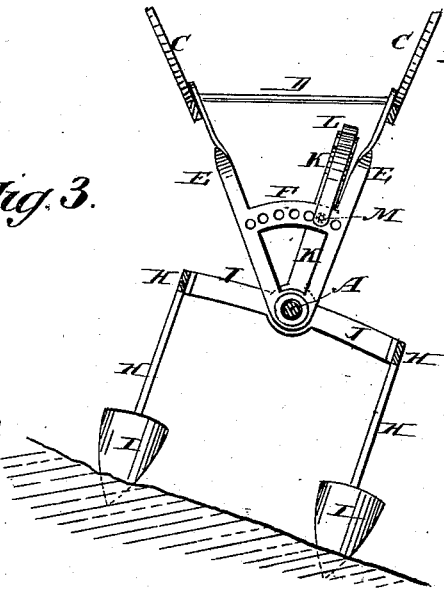
WITNESSES:
F. McArdle
C. Sedgwick
INVENTOR:
W. B. Cullum
BY Munn &Co
ATTORNEYS.

UNITED STATES PATENT OFFICE.

WALTER B. CULLUM, OF BENWOOD, WEST VIRGINIA.

CULTIVATOR.

SPECIFICATION forming part of Letters Patent No. 255,256, dated March 21, 1882.

Application filed December 23, 1881. (Model.)

*To all whom it may concern:*

Be it known that I, WALTER B. CULLUM, of Benwood, Marshall county, West Virginia, have invented a new and useful Improvement in Double-Shovel Plows, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a sectional side elevation of the same, taken through the line $x\,x$, Fig. 1; and Fig. 3 is a sectional front elevation of the same, taken through the line $y\,y$, Fig. 1.

The object of this invention is to facilitate the guiding and controlling of plows when plowing upon the sides of hills.

The invention consists in the combination, with the draw-bar, of the loose collar, the plow-beams, the connecting-bar, the operating-lever, and means for locking the same; and also in the combination, with the cross-bar attached to the plow-beams, and the braces connecting the handles and draw-bar, of the lever, the spring-catch lever and the catch-bar, whereby the plow-beams can be readily locked in place, unlocked, and adjusted, as will be hereinafter fully described.

A represents the draw-bar of the plow, to the forward end of which is attached the clevis B.

To the middle part of the bar A is attached the forward ends of the handles C, the rear parts of which are connected and held at the proper distance apart by a round, D. The handles C are supported at the proper elevation by the braces E, the upper ends of which are attached to the said handles, and their lower ends are attached to the rear end of the draw-bar A. The braces E are connected by an arched bar, F, in which are formed a number of holes to receive a catch-pin hereinafter described.

Upon the draw-bar A, at the forward ends of the handles C, is placed a loose collar, G, to the opposite sides of which are attached the forward ends of the plow-beams H. The plow-beams H are made of different lengths, and their rear parts are curved downward and have shovels I attached to their ends. The rear parts of the plow-beams H are connected and held at a proper distance from each other by a cross-bar, J, which has a hole formed through its center to receive and work upon the rear end of the draw-bar A.

To the center of the cross-bar J is attached the lower end of the bar K, which projects upward at right angles with the said cross-bar J. The upper part of the bar K is curved to the rearward to serve as a handle in adjusting the plows, and to it is fulcrumed a lever, L, the forward part of which is curved downward along the forward side of the lever K and across the forward side of the cross-bar F.

To the lower end of the lever L is attached a catch-pin, M, which passes through the cross-bar F and the lever K to lock the said lever K in place. The upper end of the lever L rises above the upper end of the lever K to give the said lever L enough play to allow its lower end to be raised sufficiently to withdraw the catch-pin M from the cross-bar F.

Between the upper ends of the levers K L is placed a spring, N, to hold the catch-pin M in place.

With this construction by operating the levers K L the plow-beams and plows can be swung to either side to bring them into such a position that the handles will be upright while the plows are working upon the side of a hill, as illustrated in Fig. 3.

Having thus described my invention, I claim as new and desire to secure by Letters Patent—

1. In a double-shovel plow, the combination, with the draw-bar A, of the loose collar G, the plow-beams H, the connecting-bar J, the lever K, and means for locking the same, substantially as and for the purpose set forth.

2. In a double-shovel plow, the combination, with the cross-bar J, attached to the plow-beams H, and, the braces E, connecting the handles C and draw-bar A, of the lever K, the spring-catch lever L, and the cross-bar F, substantially as herein shown and described, whereby the plow-beams can be readily locked in place, unlocked, and adjusted, as set forth.

WALTER BEAUREGARD CULLUM.

Witnesses:
GEORGE W. REILLY,
JOHN D. REILLY.